United States Patent
Kannan et al.

(10) Patent No.: US 11,157,983 B2
(45) Date of Patent: Oct. 26, 2021

(54) GENERATING A FRAMEWORK FOR PRIORITIZING MACHINE LEARNING MODEL OFFERINGS VIA A PLATFORM

(71) Applicant: International Business Machines Corporation, Armonk, NY (US)

(72) Inventors: Kalapriya Kannan, Bangalore (IN); Samiulla Zakir Hussain Shaikh, Bangalore (IN); Pranay Kumar Lohia, Bangalore (IN); Vijay Arya, Bangalore (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 16/504,629

(22) Filed: Jul. 8, 2019

(65) Prior Publication Data
US 2021/0012404 A1   Jan. 14, 2021

(51) Int. Cl.
G06Q 30/00 (2012.01)
G06Q 30/06 (2012.01)
G06N 20/00 (2019.01)

(52) U.S. Cl.
CPC ......... *G06Q 30/0629* (2013.01); *G06N 20/00* (2019.01); *G06Q 30/0621* (2013.01); *G06Q 30/0641* (2013.01)

(58) Field of Classification Search
CPC ........... G06Q 30/0629; G06Q 30/0621; G06Q 30/0641; G06N 20/00
See application file for complete search history.

(56) References Cited

U.S. PATENT DOCUMENTS

| | | |
|---|---|---|
| 2011/0022525 A1 | 1/2011 | Swinson et al. |
| 2011/0258067 A1 | 10/2011 | Rowell |
| 2017/0185921 A1 | 6/2017 | Zhang |
| 2018/0089591 A1 | 3/2018 | Zeiler et al. |

(Continued)

OTHER PUBLICATIONS

Chen, Lingjiao, Paraschos Koutris, and Arun Kumar. "Model-based pricing for machine learning in a data marketplace." arXiv preprint arXiv: 1805.11450 (2018).*

(Continued)

*Primary Examiner* — Kathleen Palavecino
(74) *Attorney, Agent, or Firm* — Ryan, Mason & Lewis, LLP

(57) ABSTRACT

Methods, systems, and computer program products for generating a framework for prioritizing machine learning model offerings via a platform are provided herein. A computer-implemented method includes processing, via a computing platform, a machine learning model input by a first user and metadata corresponding to the machine learning model input by the first user; automatically comparing, via the computing platform, the metadata corresponding to the machine learning model with metadata corresponding to one or more existing machine learning models stored by the computing platform; automatically calculating, via the computing platform, initial pricing information for the machine learning model based on the comparison; and outputting, via an interactive user interface of the computing platform, the machine learning model to one or more additional users for purchase in accordance with the calculated initial pricing information.

19 Claims, 9 Drawing Sheets

(56) References Cited

U.S. PATENT DOCUMENTS

2018/0089593 A1* 3/2018 Patel .................. G06F 8/60

OTHER PUBLICATIONS

Zhou, Xianfei, et al. "A Secure and Privacy-Preserving Machine Learning Model Sharing Scheme for Edge-Enabled IoT." IEEE Access 9 (2021): 17256-17265.*

Bailey S., Monetizing your models with machine learning solutions, InfoWorld, https://www.infoworld.com/article/3269002/machine-learning/monetizing-your-models-with-machine-learning-solutions.html, Apr. 24, 2018.

Chen et al., Model-Based Pricing for Machine Learning in a Data Marketplace, May 2018.

IP.com; IPCOM000252275D, Ranking and Automatic Selection of Machine Learning Models, Jan. 3, 2018.

IP.com; IPCOM000250922D, System and Method of Secure and Permissioned Sharing of Cognitive Patterns in a Marketplace, Sep. 14, 2017. (https://priorart.ip.com/IPCOM/000250922).

AWS Amazon.com, Introducing Amazon SageMaker, https://aws.amazon.com/about-aws/whats-new/2017/11/introducing-amazon-sagemaker/, Nov. 29, 2017.

* cited by examiner

GENERATING A FRAMEWORK FOR PRIORITIZING MACHINE LEARNING MODEL OFFERINGS VIA A PLATFORM

FIELD

The present application generally relates to information technology and, more particularly, to management of machine learning models.

BACKGROUND

Machine learning (ML) models are increasingly utilized in a growing number of industries, and users are increasingly willing to spend time to develop such models and offer such developed models for sale to customers. However, conventional ML model development approaches typically do not include a framework that commoditizes such models, limiting the potential reach of the developed models and the ability for interested users to purchase and/or utilize the developed models.

SUMMARY

In one embodiment of the present invention, techniques for generating a framework for prioritizing machine learning model offerings via a platform are provided. An exemplary computer-implemented method can include processing, via a computing platform, at least one machine learning model input by a first user and metadata corresponding to the at least one machine learning model input by the first user. The method also includes automatically comparing, via the computing platform, the metadata corresponding to the at least one machine learning model with metadata corresponding to one or more existing machine learning models stored by the computing platform. Further, the method additionally includes automatically calculating, via the computing platform, initial pricing information for the at least one machine learning model based at least in part on the comparison, and outputting, via an interactive user interface of the computing platform, the at least one machine learning model to one or more additional users for purchase in accordance with the calculated initial pricing information.

In another embodiment of the invention, an exemplary computer-implemented method can include outputting to a first user, via a first interactive user interface of a computing platform, (i) a collection of datasets, (ii) a set of machine learning models, and (iii) a set of configuration details pertaining to the set of machine learning models. Additionally, the method includes processing, via the computing platform, (i) a selection of at least one of the datasets by the first user, (ii) a selection of at least one of the machine learning models by the first user, (iii) a selection of one or more of the configuration details by the first user, and (iv) metadata, provided by the first user, related to the at least one machine learning model selected by the first user. The method also includes automatically training, via the computing platform, the at least one machine learning model selected by the first user on the at least one dataset selected by the first user in accordance with (i) the one or more configuration details selected by the first user and (ii) the metadata provided by the first user, and automatically comparing, via the computing platform, the at least one trained machine learning model with one or more of the set of machine learning models stored by the computing platform. Further, the method includes automatically calculating, via the computing platform, initial pricing information for the at least one trained machine learning model based at least in part on the comparison, and outputting, via a second interactive user interface of the computing platform, the at least one trained machine learning model to one or more additional users for purchase in accordance with the calculated initial pricing information.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
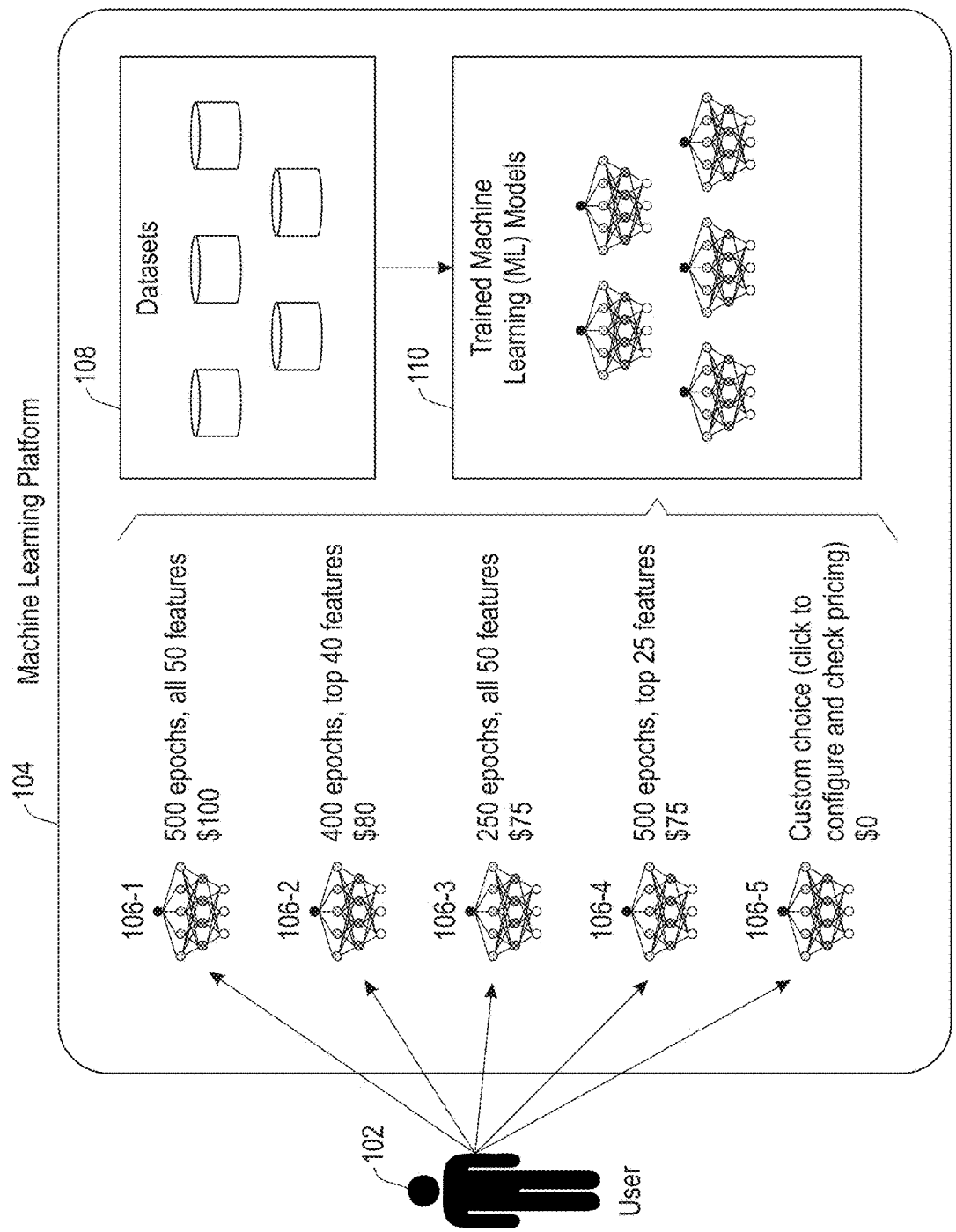
FIG. 1 is a diagram illustrating system architecture, according to an exemplary embodiment of the invention.

As described herein, an embodiment of the present invention includes generating a framework for prioritizing machine learning models. At least one embodiment includes generating and providing a marketplace framework for pricing and monetizing and/or selling machine learning and/or artificial intelligence (AI) models based on multiple characteristic facets of the models that impact results obtained via one or more machine learning algorithms. Such an embodiment includes providing and/or building a model cataloging service by provisioning automatically-scaled versions of available machine learning models.

Additionally, such an embodiment includes monitoring the activities on machine learning platforms to identify the pricing of various trained models and the potentially useful custom variants of such models. Also, at least one embodiment includes providing automatic and dynamic preset offerings and pricing models based on parameters such as, for example, epochs, features, metrics (accuracy, precision, bias, robustness, etc.), data volume and/or size, ratings provided by different users, and model characteristics such as robustness, fairness, explainability, etc. As used herein, presets refer to default offerings for each machine learning model. For example, a full version of a machine learning model will be a default preset. Additionally, in one or more embodiments, there can be various presets having different training epochs or different amounts of training data used. The purpose of such presets is to have some options for users for a new model, for which enough usage data are not available, to intelligently provide appropriate scaled-down offerings.

Further, at least one embodiment includes generating and providing an automatic notification for updated versions of existing models, along with an incremental change comparison and the price differential. As also detailed herein, one or more embodiments include automatically updating machine learning models on a service platform and/or marketplace as different instances, variants and/or versions, and providing user interfaces that present one or more options to select and/or access the model representations.

By way merely of illustration, multiple example use cases are outlined below. For instance, in one use case, a user logs-in to the machine learning platform (also referred to herein as a framework) to offer a developed machine learning model for sale on the platform. As part of this process, the user inputs metadata information about the model via a user interface, and also projects a minimum price and a maximum price for the model, if any is desired. Such metadata can include, for example, the name of the model, a description of the model, the category of model, the identity of the dataset upon which the model was trained, the number of epochs trained, the last training date, one or more target users, the model format, the number of data points, the number of features, identity of the training algorithm, one or more model characteristics, composability of model output, observed metrics, model runtime, etc.

In another use case, a user logs-in to the machine learning platform to edit information and/or metadata of an existing machine learning model (already uploaded onto the platform). In such a process, the user inputs the relevant metadata information (such as the example metadata noted above in connection with the first use case) about the model in question. Additionally, the users who already purchased this model are automatically notified about the updates.

In yet another example use case, a user logs-in to the machine learning platform to replace an existing model (already uploaded onto the platform). In such a process, the user uploads the new and/or replacement model to a central repository and/or to the cloud. Additionally, the users who already purchased this model are automatically notified about the replacement version.

Further, in another use case, a user logs-in to the machine learning platform to search for and potentially purchase a machine learning model. In such a scenario, the user provides and/or inputs a (brief) description of the model requirements and a one or more items of metadata relevant to the sought model. Such metadata can include pricing information, model category, observed metrics, etc. Based on such inputs, the platform generates and presents to the user a list of available models. The user can then select from among the listed choices and proceed to a purchase. Additionally, in such a use case, the platform can generate and provide the user (via a user interface) with statistics of sales and purchases across one or more portions of the model database (in connection with the platform). Such statistics can include the number of users who purchased models over a given timeframe, the amount of revenue generated from model sales, the most frequently downloaded model category, etc. Further, the platform can generate and provide the user with statistics pertaining to the sales and purchases attributed to his or her account. Such statistics can include the last purchase order date, the amount spent purchasing models for a given timeframe, the last model(s) sold, revenue generated by selling models, etc.

In yet another example use case, a user submits a dataset and a training program, and selects one or more options for creating one or more categories of machine learning models. Such options can pertain, for example, to model features, pricing, use sampling, etc. In such a use case, at least one embodiment of the invention includes generating one or more machine learning models with different pricing and enabling the user (via a user interface) to publish and/or offer such models for sale on the platform. Model metadata utilized for pricing can include, for example, dataset-related metadata, metadata related to training algorithms, performance-related metadata, etc.

Additionally, in one or more embodiments, when a user purchases a model from the platform, the user can choose to use the purchased model online in the platform (and, for example, only pay for the hosting cost), or the user can opt to download the purchased model and run the model locally or deploy the model elsewhere.

FIG. 1 is a diagram illustrating system architecture, according to an embodiment of the invention. By way of illustration, FIG. 1 depicts a machine learning platform 104, which receives input from a user 102 in the form of machine learning models 106-1, 106-2, 106-3, 106-4, 106-5, etc. (collectively referred to herein as models 106). Within the machine learning platform 104, the models 106 are trained by one or more datasets 108, thereby creating a set of trained machine learning models 110.

Figure 2:
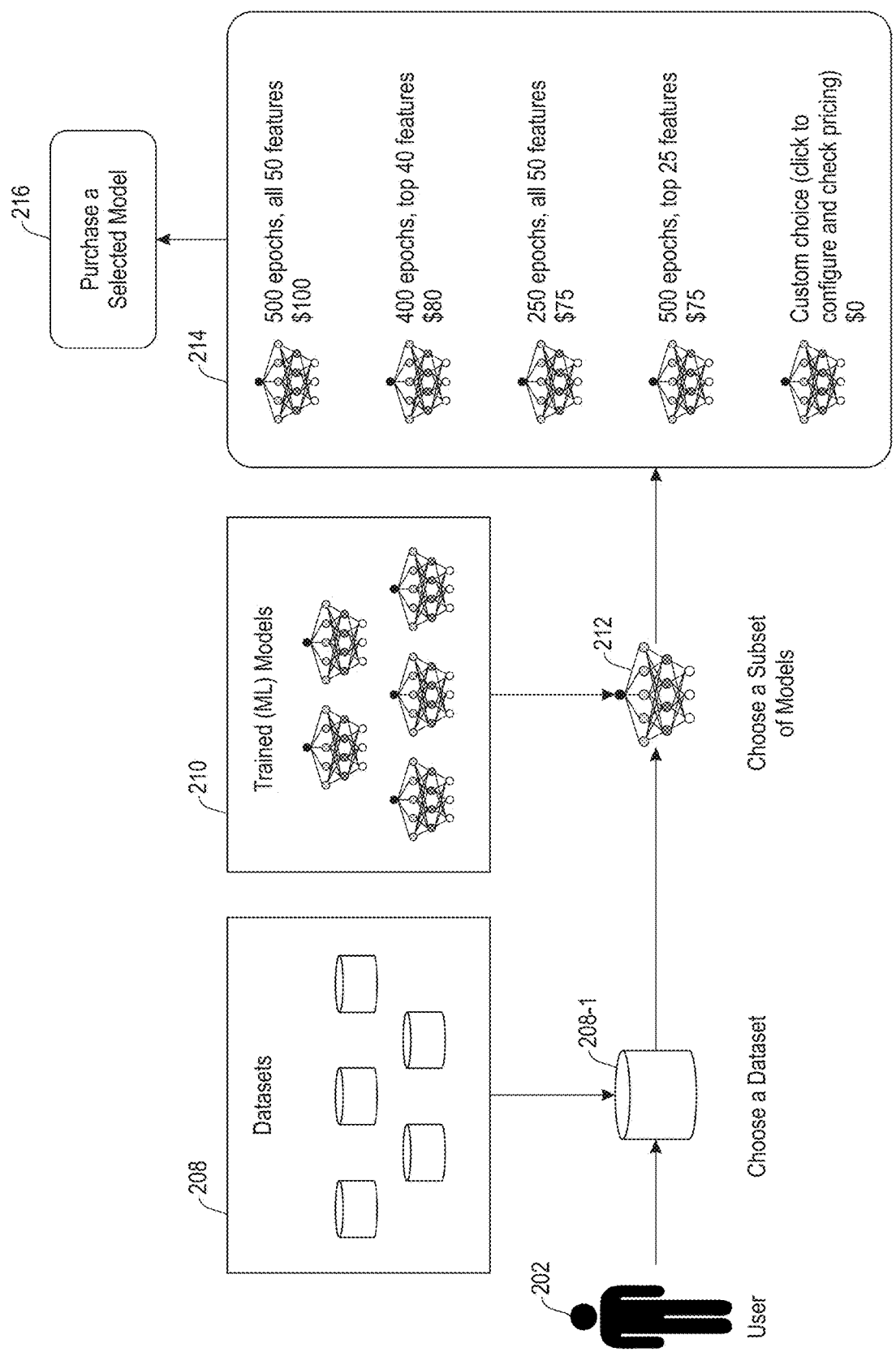
FIG. 2 is a diagram illustrating a user workflow, according to an exemplary embodiment of the invention.

FIG. 2 is a diagram illustrating a user workflow, according to an exemplary embodiment of the invention. By way of illustration, FIG. 2 depicts a user 202 selecting a dataset 208-1 from a collection of datasets 208. Additionally, the user 202 selects a subset of models 212, from a set of trained machine learning models 210, to be used in connection with the selected dataset 208-1. Based on these selections, at least one embodiment includes generating and presenting to the user 202, via a user interface, a list 214 of the selected subset of models, wherein the list 214 includes additional information such as epoch-related information, feature-related information, and pricing information for each of the listed models. Accordingly, user 202 can then purchase, in step 216, at least one of the models selected from the presented list 214.

Additionally, as detailed herein, at least one embodiment includes dynamically updating presets and pricing information in connection with one or more machine learning models. Updating presets includes tracking the purchase counts of presets and tracking the purchase counts of custom configurations, estimating the popularity of presents and custom configurations, and selecting the best among all presets and custom configuration to obtain and/or determine new presets. Updating pricing information includes estimating the expected selling rate for a given model configuration, comparing the expected sales with the actual past sales, and updating the price based on the comparison.

Additionally, one or more embodiments include automating pricing of one or more models. Such an embodiment includes comparing the creator's model with one or more platform standard models. Such a comparison can include comparing metadata and one or more characteristics to determine an initial base pricing of the (creator's) model based on the pricing of the one or more standard models. By way merely of example, assume that the price of a standard model is $45 (with an accuracy=90%), and the creator's model has an accuracy of 80%. In such an example, the standard price will be $40.

Accuracy, as used in this context, includes a ratio of correctly classified test samples to the total number of samples. One or more embodiments can additionally and/or alternatively include using other metrics such as precision, recall, and f-score. In such an embodiment, precision includes the ratio of correctly classified examples of a class c to the total number of data points labeled with class c, recall includes the ratio of correctly classified examples of class c to the actual number of instances of class c, and f-score includes the harmonic mean of precision and recall.

Additionally, one or more embodiments include examining the metadata and performing linear pricing of one or more presets with feature groups, data size, accuracy, confidence, precision, robustness, fairness and epochs trained of the model. Based on the linear evaluation of such characteristics, at least one embodiment includes linearly modifying the pricing information. Say, for example, the system weights these characteristics by $2 such that the price of the creator's model will be $45+4*($2)=$53.

If the user has uploaded various scaled-up and scaled-down versions, one or more embodiments include comparing each model behavior in terms of its characteristics. By way merely of example, assume that a user, who wants to sell a model, will start with a base version of a particular model. The user also has a choice to add various versions of the same model in order to provide choices to the consumer users. These additional models can have some improvements over the base version (that is, scaled-up version with mostly higher costs), or the additional models can include scaled-down versions (for consumers concerned, for example, about cost more than accuracy, performance, fairness, etc.).

Additionally, one or more embodiments includes performing a relative pricing, for example, in the form of a range of values. Such an embodiment, based on the requirements in terms of one or more characteristics, includes suggesting dynamic pricing of the model in question. Based on the scaled versions, at least one embodiment includes identifying the swing of pricing information, and generating an optimized fixed number of scaled up/down versions of the models based on different characteristic facets for purchase.

Figure 3:
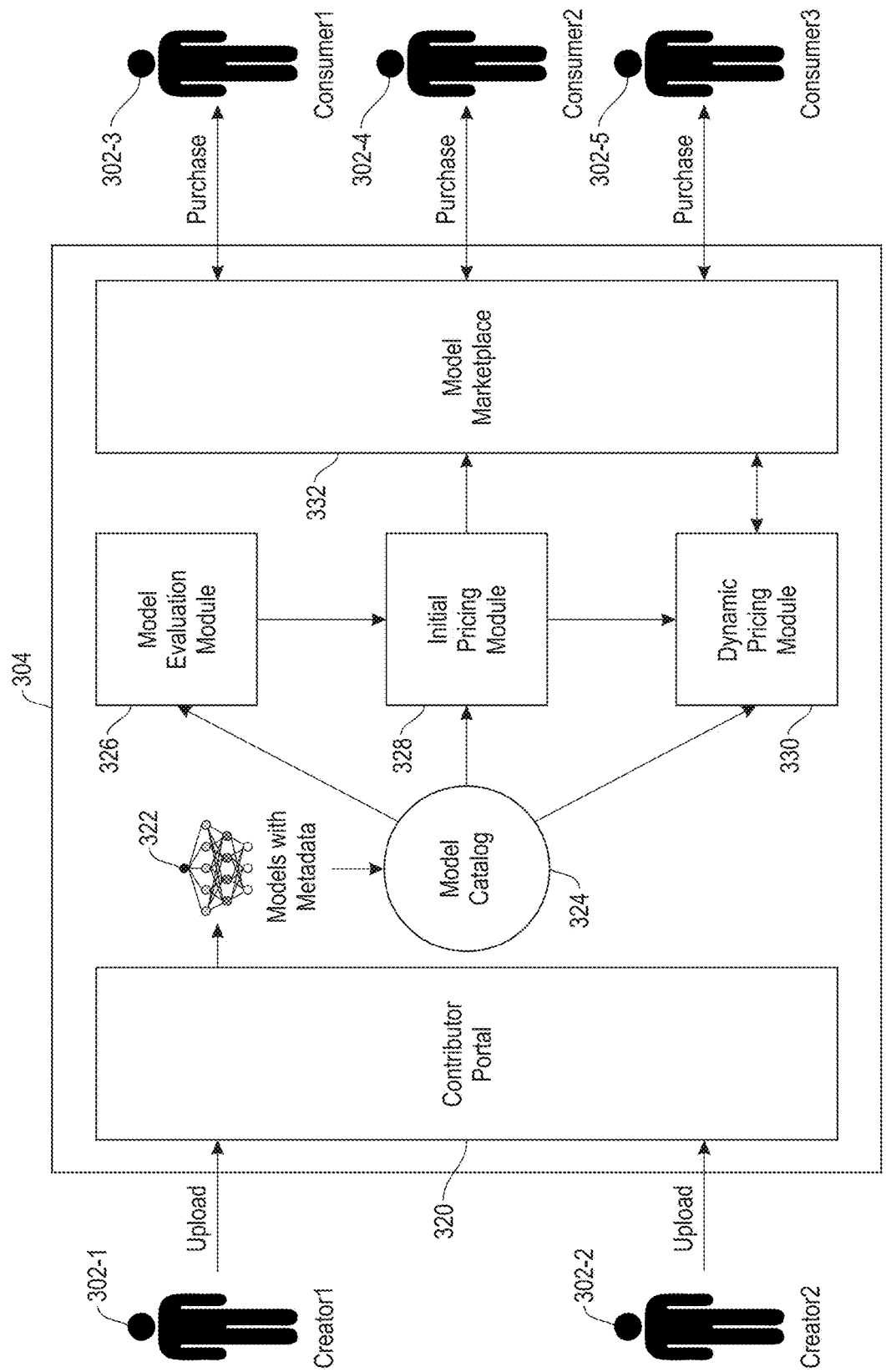
FIG. 3 is a diagram illustrating system architecture, according to an embodiment of the invention.

FIG. 3 is a diagram illustrating system architecture, according to an embodiment of the invention. By way of illustration, FIG. 3 depicts machine learning platform 304, which includes a contributor portal 320, a model catalog 324, a model evaluation module 326, an initial pricing module 328, a dynamic pricing module 330, and a model marketplace component 332. As also depicted in FIG. 3, a first creator 302-1 and a second creator 302-2 upload machine learning models (along with corresponding metadata) 322 to the machine learning platform via contributor portal 320. These uploaded models 322 are input into the model catalog 324 and additionally provided to the model evaluation module 326, the initial pricing module 328, and the dynamic pricing module 330.

In accordance with one or more embodiments, the model evaluation module 326 analyzes a machine learning model in terms of various aspects such as resources used to build the model, performance and accuracy, fairness, robustness, etc. Additionally, the initial pricing module 328 uses the parameters estimated by the model evaluation module 326 to determine the initial cost of the model (and informing the owner of the model). The owner (seller) of the model can have an ability to accept or decline the initial price. Accordingly, this initial price can serve as a recommendation to the owner. Further, the dynamic pricing module 330 assesses various factors such as demand/supply, trends, user behaviors, etc., to update the prices of models dynamically over time.

Referring again to FIG. 3, output from the model evaluation module 326 is provided to the initial pricing module 328, and output from the initial pricing module 328 is provided to both the dynamic pricing module 330 and the model marketplace 332. The dynamic pricing module 330 also interacts with the model marketplace 332 to generate offerings of machine learning models to be purchased by consumers 302-3, 302-4, 302-5, etc.

Accordingly, FIG. 3 illustrates an example embodiment wherein a creator creates his or her machine learning model outside of the machine learning platform. In such an embodiment, the platform supports multiple model environments. By way of example, assume that the creator has a model M trained using a dataset D. The user uploads the model M in any of the versions supported by the platform. The user can also upload multiple versions of the model (M1, M2, M3, etc.), for example, to perform a pricing comparison based on the characteristics of the model versions (where such characteristics include accuracy, confidence, precision, robustness, fairness, explainability, epochs trained, etc.).

As illustrated in FIG. 3, the user provides (to the machine learning platform) metadata of the externally created machine learning models, wherein such metadata can include tasks/goal achieved by the model, epochs, feature set, dataset size, best features used during training, etc. By way merely of example, a model can include a human face detection model trained on image data with 1000 epochs, and a feature set of color, intensity, depth, positions of different sense organs on the face, gender, age etc., and an indication of best features used that includes gender, intensity, and positions of sense organs. Also, in one or more embodiments, a user can upload (to the machine learning platform) multiple scaled-up and/or scaled-down versions of a machine learning model with different feature sets, epochs etc.

As also depicted in FIG. 3, at least one embodiment includes comparing a creator's model with one or more standard models contained within the platform. Such a comparison includes comparing the metadata and the characteristics associated with each model, and based at least on this comparison, one or more embodiments include performing an initial base pricing of the creator's model based on pricing information corresponding to the standard models used in the comparison. If the platform does not contain standard models for the purpose of carrying out such comparisons, at least one embodiment includes estimating expected selling rates for the given (creator's) model configuration based on its purpose and/or one or more other parameters. An expected selling rate can be determined and/or identified based on the price(s) quoted on different platforms for one or more applications.

Additionally, at least one embodiment includes examining the metadata of the creator's model and performing linear pricing of the presets with feature groups, accuracy, confidence, precision, robustness, fairness and epochs trained of the model. Based on the linear evaluation of these characteristics, such an embodiment can include linearly increasing or decreasing the pricing for the model. For example, say that the relevant characteristics are weighted (by the machine learning platform) by $2; as such, the price of the creator's model will be increased as follows: $45+4*($2) =$53.

If the user/creator has uploaded (using his or her platform credentials) various scaled-up and/or scaled-down versions of a machine learning model, at least one embodiment includes comparing the model behavior of each version in terms of its characteristics, and performing a relative pricing operation across the versions based at least in part of the comparison. This relative pricing, in one or more embodiments, can be in the form of a range of values (as opposed to an exact value), and accordingly, based on the requirements in terms of characteristics, such an embodiment can additionally include suggesting dynamic pricing information for the model(s). Based on the scaled versions, such an embodiment includes identifying the swing of price across the versions, and updating the price of the model accordingly.

In one or more embodiments, the machine learning platform displays the pricing information to the creator, and the creator can give permission to the platform to make the model(s) available for sale (with proper credentials given) in accordance with the displayed pricing information. Additionally, such an embodiment can include determining an optimized fixed number of scaled-up and/or scaled-down versions of the model (to display for sale) based on different characteristic facets for purchase. The displayed versions of the creator's model will then be available for purchase (according to the noted pricing information) by one or more (public) users.

Based on the sale throughput, one or more embodiments can additionally include performing dynamic fluctuations of the pricing information. For example, if the demand for the model(s) increases, the platform can increase the price, for instance, in a linear manner. Also, in at least one embodiment, different pricing strategies may be used to assign pricing information to one or more models based on inputs (such as the amount of data trained, one or more model metrics, one or more model characteristics, supply-demand information, etc.), wherein such strategies can include marginal-cost pricing, penetration pricing, premium pricing, economy pricing, psychology pricing, bundle pricing, time-sensitive pricing, value-based pricing, etc.

Figure 4:
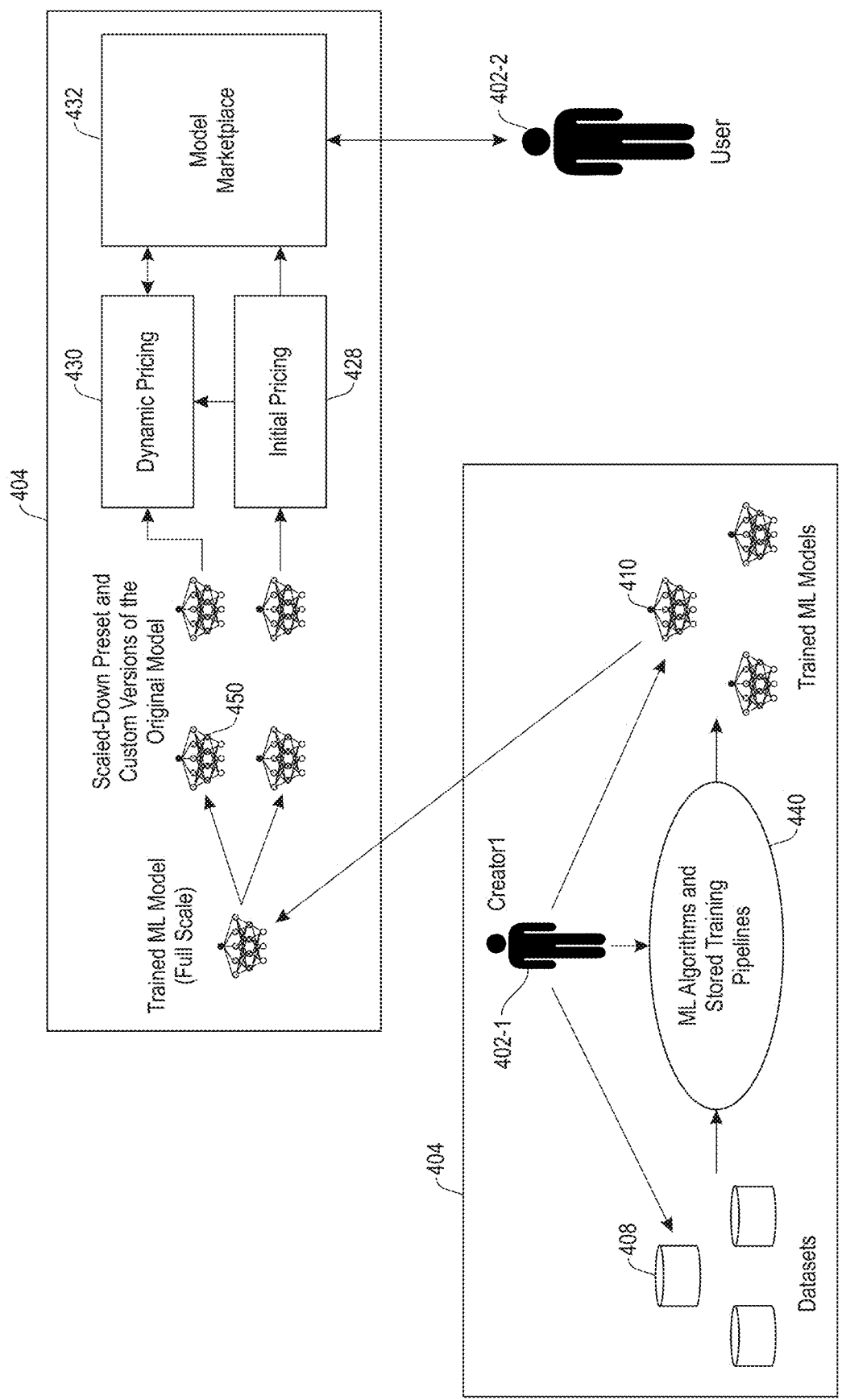
FIG. 4 is a diagram illustrating system architecture, according to an embodiment of the invention.

FIG. 4 is a diagram illustrating system architecture, according to an embodiment of the invention. By way of illustration, FIG. 4 depicts machine learning platform 404 within the context of an embodiment wherein a creator 402-1 creates a machine learning model inside the platform 404. Accordingly, the creator 402-1 logs-in to the platform 404 using his or her credentials, and the platform 404 offers a data catalog 408 and a trained ML model catalog 410. The creator 402-1 selects at least one of the datasets 408 and at least one of the models 410. Additionally, the platform 404 provides different configuration details to the creator 402-1, such that the creator 402-1 can select a subset of data features, epochs, hyper-parameters, accuracy level(s), precision level(s), confidence level(s), fairness level(s), robustness, explainability, etc.

Based at least in part of these creator selections, the platform 404 captures the settings which the creator 402-1 has provided as well as the metadata which the creator 402-1 provides (e.g., the purpose of the model, a semantic-level understanding of accuracy connected with the purpose, etc.). The creator 402-1 can subsequently train the selected model based on the settings he or she wants for the configurations provided by the platform 404. During this process, the platform 404 maintains the details of those settings, and using these settings, the platform 404 creates one or more scaled-up and/or scaled-down versions 450 of the model (taking into account, for example, relevant items of data, one or more models from the catalog, different settings, etc.).

As illustrated in FIG. 4, these different versions 450 of the model are then used to generate multiple pricing suggestions for different use cases to the user based on the configurations. Once the creator 402-1 has created the model, the platform 404 suggests to him or her an initial price of the model (via initial pricing module 428), along with the pricing information for the different versions 450. Additionally, one or more embodiments include generating an optimized fixed number of scaled-up and/or scaled-down versions of the models based on different characteristic facets for purchase.

The creator 402-1 can now, based on his or her price expectations and/or updated purpose, modify and/or select a price. Based on the price that the creator 402-1 has selected, the platform 404 provides a purchasing user 402-2, via model marketplace component 432, the option to download the model and/or to deploy the model in his or her account with a deployment identifier (ID), thereby enabling the user 402-2 to use the purchased model to call in his or her programming codes. Also, in at least one embodiment, the pricing information can be dynamically changed (via dynamic pricing module 430) based on parameters such as market demand. Such dynamic pricing can, in turn, be used in the standard pricing of other models of similar purpose.

As noted herein, at least one embodiment includes determining and/or generating an optimized number of scaled version of models based on optimized pricing considerations and different characteristic facets for purchase. In one or more embodiments, such facets include various aspects of the models including but not limited to accuracy, performance, fairness, robustness to adversarial inputs, etc. Additionally, such an embodiment, while the user is training and/or creating a model on the platform, can include, based on a pricing algorithm, keeping track of the most optimized models (or model versions) which adhere to a specific set of input characteristics and facets. If such a model satisfies the optimized features, then such an embodiment can include pricing the model as per the pricing algorithm, and denoting the model as one of the scaled-up and/or scaled-down versions of the creator's model.

Also, at least one embodiment includes automatically updating a model when the model is improved and/or modified (after purchase). In such an embodiment, all users who have purchased and/or subscribed to the original version of the machine learning model in question are automatically notified of the update(s) via their user account (with the platform). Such an update includes details such as, for example, a new price for first-time buyers of the model, the price delta for the existing users who already purchased an older version of the model, and a comparison of the different characteristics between the old model and the new model (in terms of accuracy, fairness, etc.).

Figure 5:
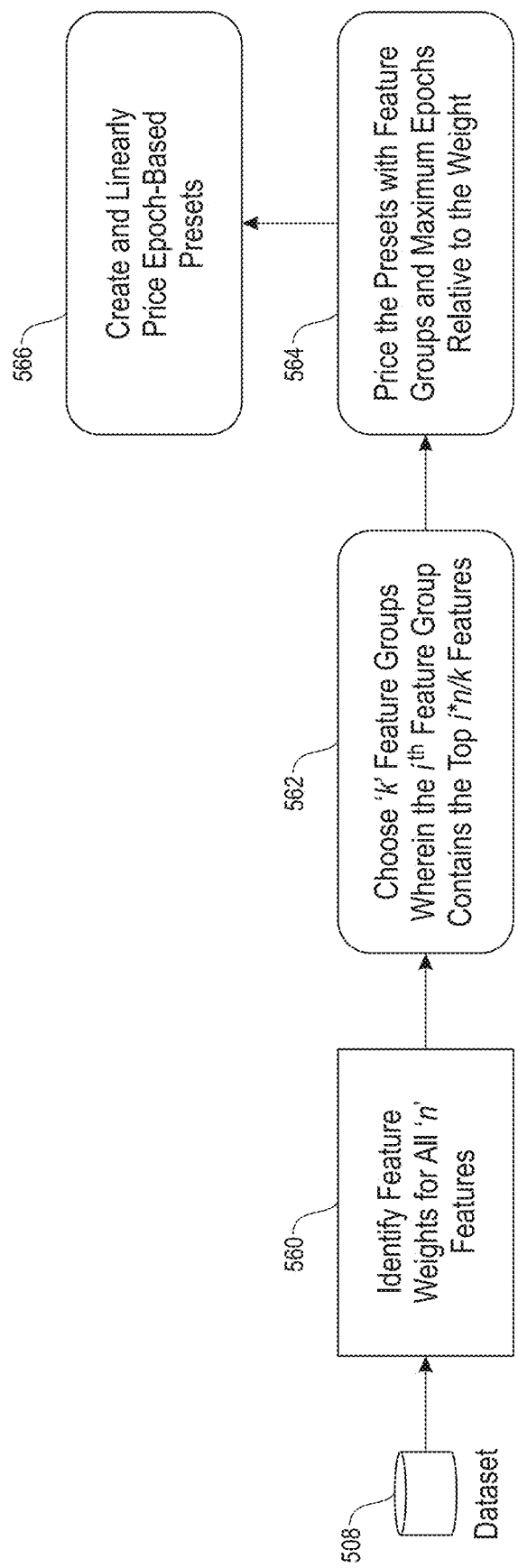
FIG. 5 is a diagram illustrating determination of preset offerings and corresponding starting prices, according to an exemplary embodiment of the invention.

FIG. 5 is a diagram illustrating determination of preset offerings and corresponding starting prices, according to an exemplary embodiment of the invention. Step 560 includes identifying feature weights for all n features in a dataset 508. In one or more embodiments, feature weights are determined via correlation of the features with the output class in the relevant training data. Such features can include, for example, the columns in the training dataset. In such an embodiment, each data point is characterized by a set of features. For example, in a customer dataset, each customer will have features such as name, address, frequency of purchase, category, etc.

Step 562 includes selecting k feature groups (from among the n features), wherein the $i^{th}$ feature group contains the top $i*n/k$ features. Additionally, step 564 includes pricing the presets for a given model based at least in part on the selected feature groups and maximum epochs relative to the identified weights. In other words, one or more embodiments include selecting top k most useful features and providing one or more scaled-down versions of the model that use only k features instead of all n features with various training epochs. Further, step 566 includes creating and linearly pricing one or more epoch-based presets for the given model.

Figure 6:
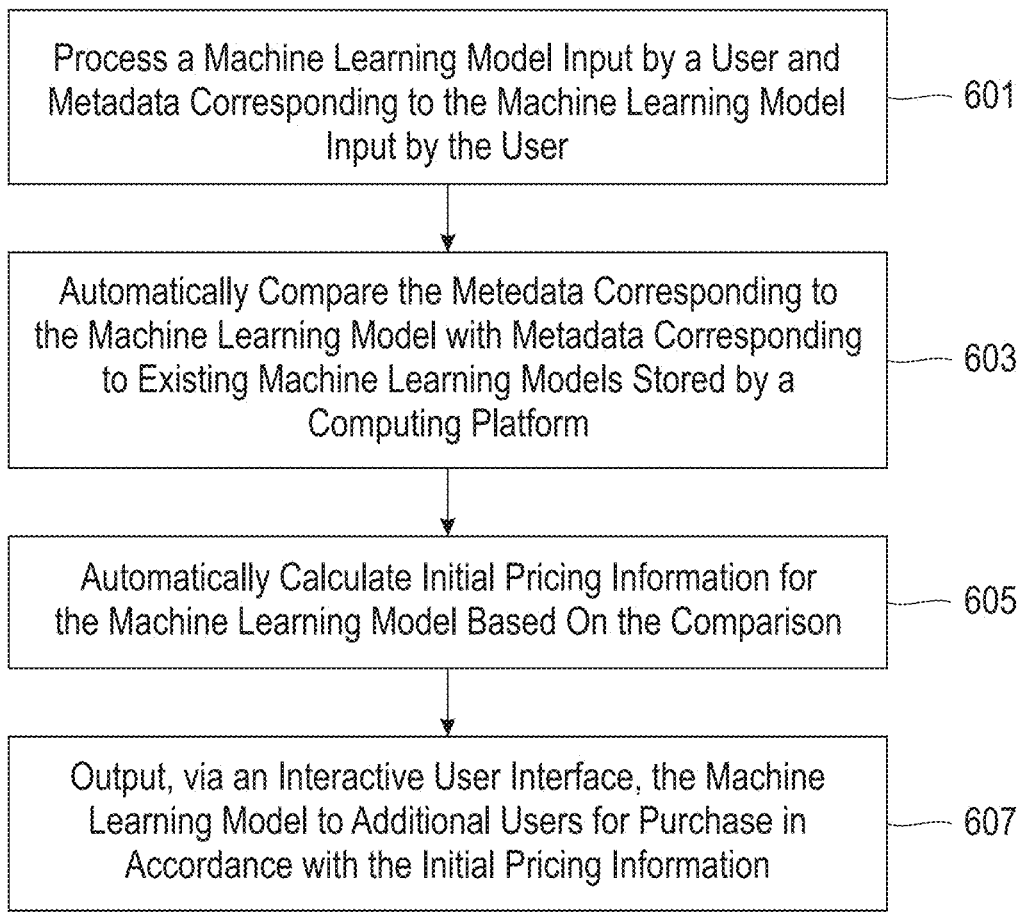
FIG. 6 is a flow diagram illustrating techniques according to an embodiment of the invention.

FIG. 6 is a flow diagram illustrating techniques according to an embodiment of the present invention. Step 601 includes processing, via a computing platform, (i) at least one machine learning model input by a first user and (ii) metadata corresponding to the at least one machine learning model input by the first user. The metadata can include, for example, (i) one or more objectives achieved by the at least one machine learning model, (ii) one or more epochs corresponding to the at least one machine learning model, (iii) a feature set corresponding to the at least one machine learning model, (iv) a dataset size corresponding to the at least one machine learning mode, and/or (v) an identified set of best features used during training of the at least one machine learning model. Step 603 includes automatically comparing, via the computing platform, the metadata corresponding to the at least one machine learning model with metadata corresponding to one or more existing machine learning models stored by the computing platform.

Step 605 includes automatically calculating, via the computing platform, initial pricing information for the at least one machine learning model based at least in part on said comparing. In at least one embodiment, calculating the initial pricing information can include calculating a linear pricing schedule for multiple aspects of the at least one machine learning model. Such an embodiment can additionally include modifying the initial pricing information for the at least one machine learning model based on the linear pricing schedule calculated for the multiple aspects of the at least one machine learning model. Step 607 includes outputting, via an interactive user interface of the computing platform, the at least one machine learning model to one or more additional users for purchase in accordance with the calculated initial pricing information.

In at least one embodiment, the at least one machine learning model input by the first user includes multiple versions of a machine learning model. In such an embodiment, the multiple versions of the machine learning model can include one or more scaled-up versions of the machine learning model and one or more scaled-down versions of the machine learning model. Additionally, in such an embodiment, the multiple versions of the machine learning model can include different feature sets and/or different epochs. Further, such an embodiment also includes comparing model behavior of the multiple versions of the machine learning model in terms of one or more model characteristics and performing a relative pricing operation across the multiple versions of the machine learning model based at least in part of the comparison of model behavior. Such an embodiment can additionally include determining an optimized fixed number of versions of the machine learning model to output to the one or more additional users for purchase. Also, such an embodiment can include ranking the multiple versions of the machine learning model based at least in part on one or more value-based parameters, and wherein the outputting step (i.e., step 607) includes outputting the multiple versions of the machine learning model to one or more additional users for purchase in accordance with said ranking.

The techniques depicted in FIG. 6 can also include outputting, via an interactive user interface of the computing platform, the initial pricing information to the first user; and enabling the first user to provide authorization of the initial pricing information via the interactive user interface. Further, at least one embodiment can include automatically performing dynamic modifications of the initial pricing information based at least in part on sale throughput information related to the at least one machine learning model.

Also, an additional embodiment of the invention includes outputting to a first user, via a first interactive user interface of a computing platform, (i) a collection of datasets, (ii) a set of machine learning models, and (iii) a set of configuration details pertaining to the set of machine learning models. Additionally, such an embodiment includes processing, via the computing platform, (i) a selection of at least one of the datasets by the first user, (ii) a selection of at least one of the machine learning models by the first user, (iii) a selection of one or more of the configuration details by the first user, and (iv) metadata, provided by the first user, related to the at least one machine learning model selected by the first user. Such an embodiment also includes automatically training, via the computing platform, the at least one machine learning model selected by the first user on the at least one dataset selected by the first user in accordance with (i) the one or more configuration details selected by the first user and (ii) the metadata provided by the first user, and automatically comparing, via the computing platform, the at least one trained machine learning model with one or more of the set of machine learning models stored by the computing platform. Further, such an embodiment includes automatically calculating, via the computing platform, initial pricing information for the at least one trained machine learning model based at least in part on the comparison, and outputting, via a second interactive user interface of the computing platform, the at least one trained machine learning model to one or more additional users for purchase in accordance with the calculated initial pricing information.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
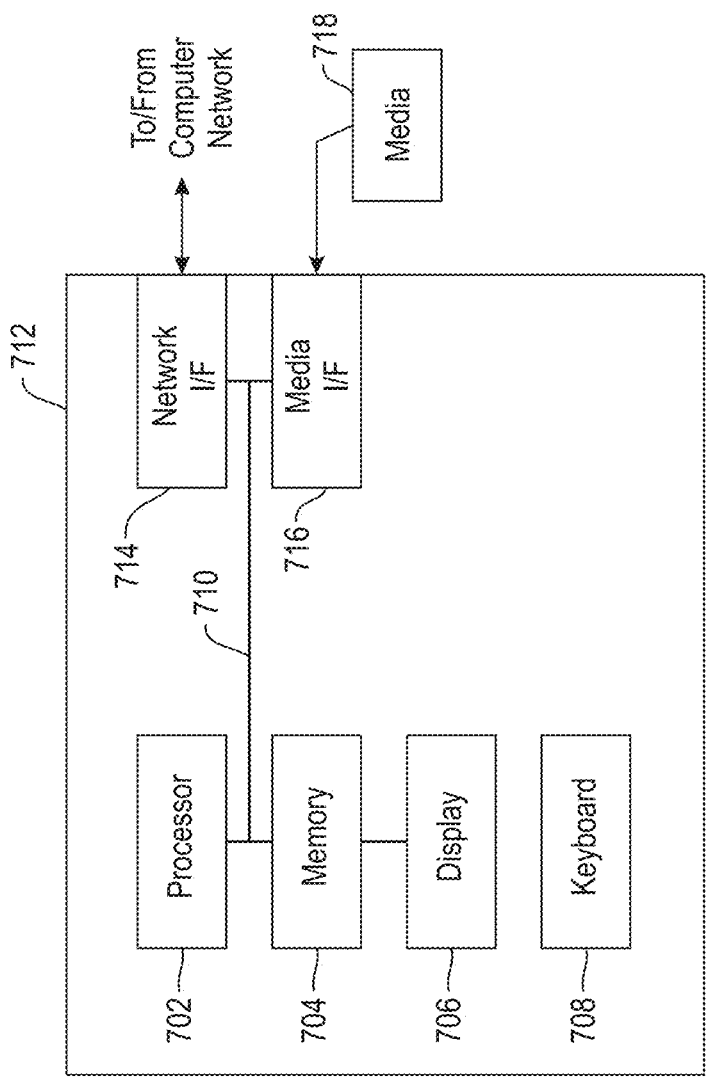
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
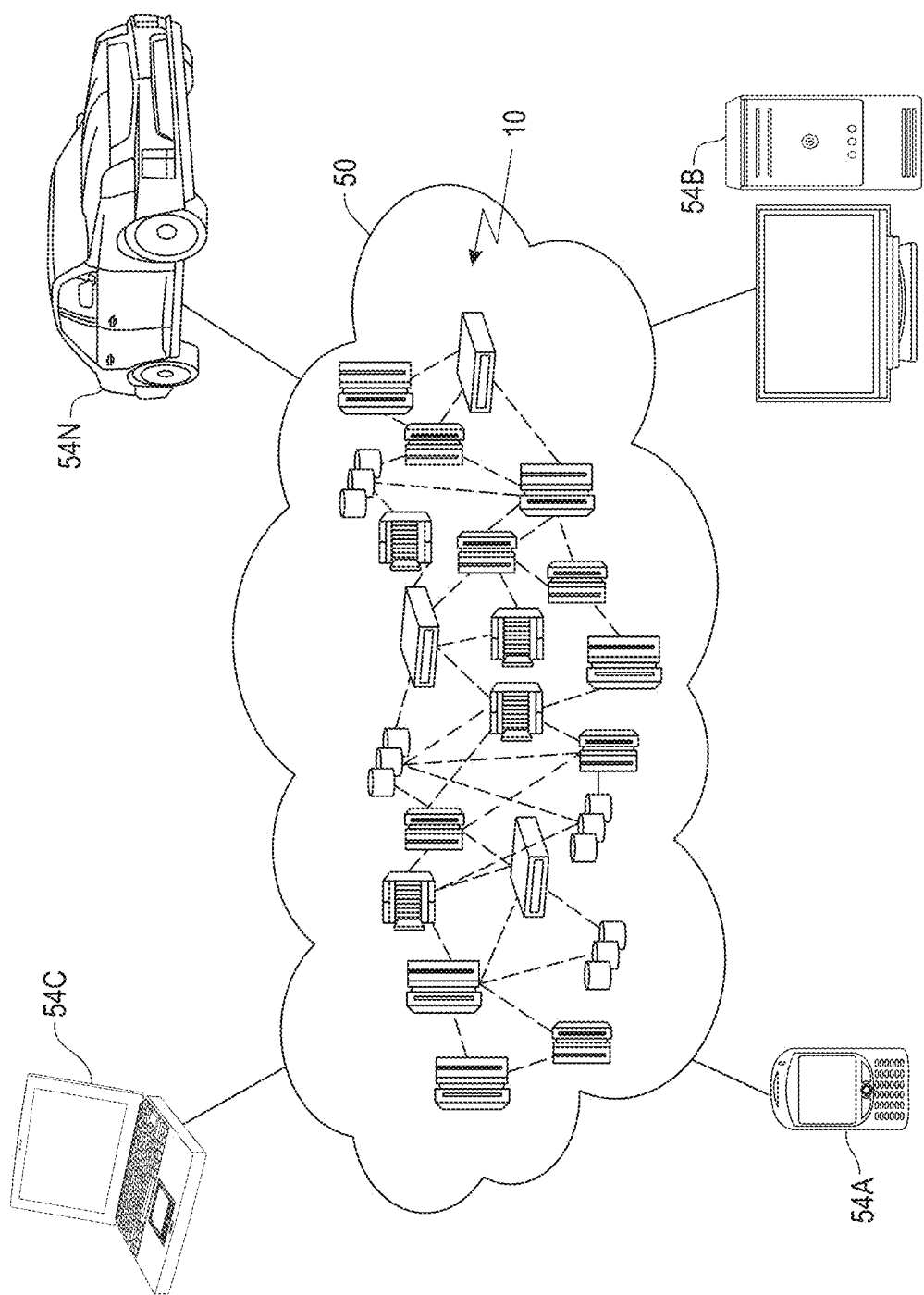
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
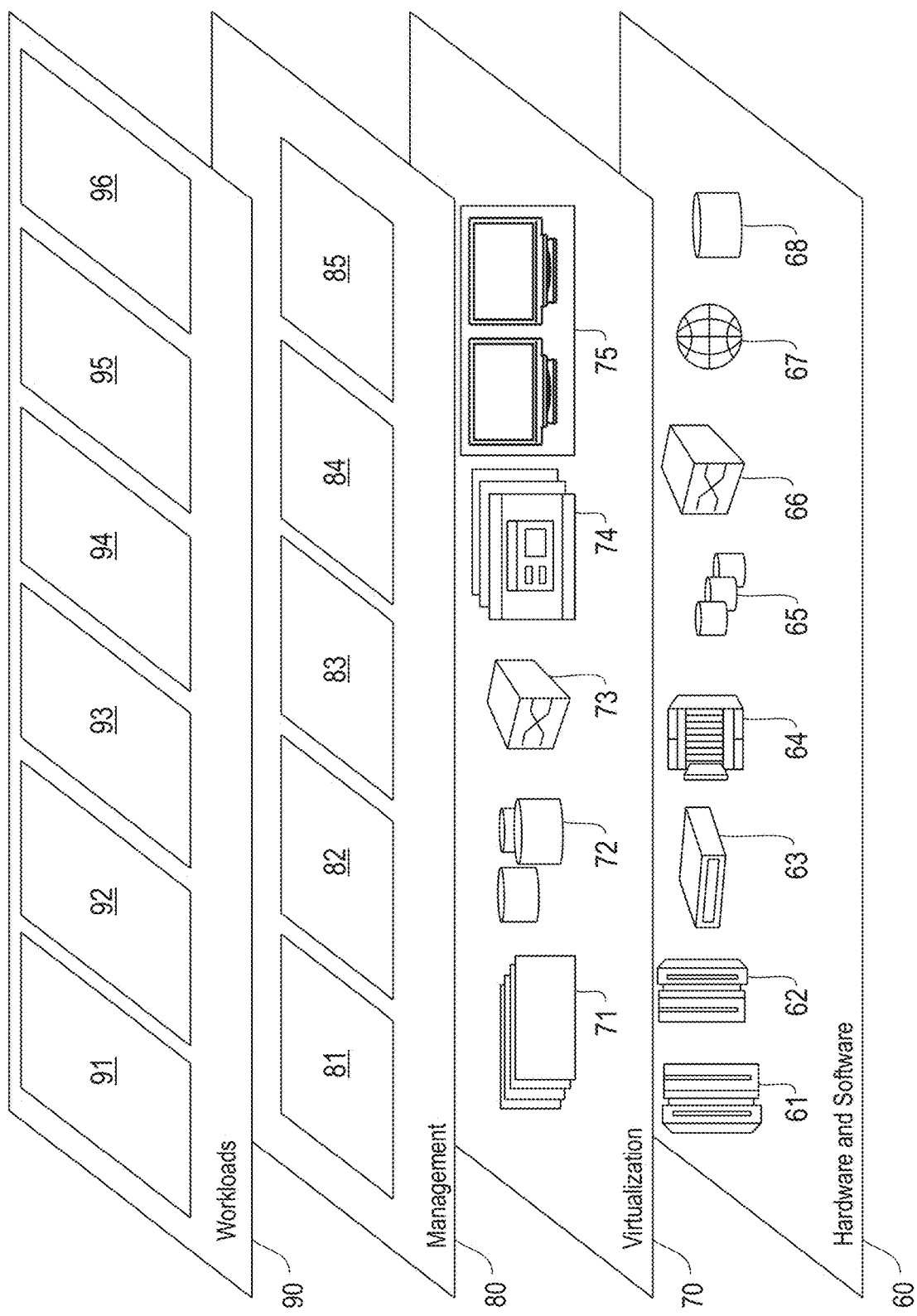
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prioritizing machine learning models 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, providing automatic and dynamic offerings and pricing models based on attributes such as, for example, epochs, features, metrics, data volume and/or size, user ratings, as well as model characteristics such as, for example, robustness, fairness, explainability, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   processing, via a computing platform, (i) at least one machine learning model input by a first user and (ii) metadata corresponding to the at least one machine learning model input by the first user, wherein the at least one machine learning model input by the first user comprises multiple versions of the machine learning model;
   automatically comparing, via the computing platform, the metadata corresponding to the at least one machine learning model with metadata corresponding to one or more existing machine learning models stored by the computing platform;
   automatically calculating, via the computing platform, initial pricing information for the at least one machine learning model, based at least in part on said comparing;
   outputting, via an interactive user interface of the computing platform, the at least one machine learning model to one or more additional users for purchase in accordance with the calculated initial pricing information; and
   in response to a given one of the one or more additional users purchasing at least one of the multiple versions of the machine learning model, providing a deployment identifier to enable the at least one of the multiple versions to be deployed in programming code of the given user.

2. The computer-implemented method of claim 1, wherein the multiple versions of the machine learning model comprise one or more scaled-up versions of the machine learning model and one or more scaled-down versions of the machine learning model.

3. The computer-implemented method of claim 1, wherein the multiple versions of the machine learning model comprise at least one of different feature sets and different epochs.

4. The computer-implemented method of claim 1, comprising:
   comparing model behavior of the multiple versions of the machine learning model in terms of one or more model characteristics; and
   performing a relative pricing operation across the multiple versions of the machine learning model, based at least in part of said comparison of model behavior.

5. The computer-implemented method of claim 1, comprising:
   determining an optimized fixed number of versions of the machine learning model to output to the one or more additional users for purchase.

6. The computer-implemented method of claim 1, comprising:
   ranking the multiple versions of the machine learning model based at least in part on one or more value-based parameters; and
   wherein said outputting comprises outputting the multiple versions of the machine learning model to one or more additional users for purchase in accordance with said ranking.

7. The computer-implemented method of claim 1, wherein the metadata comprise at least one of (i) one or more objectives achieved by the at least one machine learning model, (ii) one or more epochs corresponding to the at least one machine learning model, (iii) a feature set corresponding to the at least one machine learning model, (iv) a dataset size corresponding to the at least one machine learning mode, and (v) an identified set of best features used during training of the at least one machine learning model.

8. The computer-implemented method of claim 1, wherein said calculating the initial pricing information comprises calculating a linear pricing schedule for multiple aspects of the at least one machine learning model.

9. The computer-implemented method of claim 8, comprising:
   modifying the initial pricing information for the at least one machine learning model based on the linear pricing schedule calculated for the multiple aspects of the at least one machine learning model.

10. The computer-implemented method of claim 1, comprising:
    outputting, via an interactive user interface of the computing platform, the initial pricing information to the first user; and
    enabling the first user to provide authorization of the initial pricing information via the interactive user interface.

11. The computer-implemented method of claim 1, comprising:
    automatically performing dynamic modifications of the initial pricing information based at least in part on sale throughput information related to the at least one machine learning model.

12. A computer program product comprising a non-transitory computer readable storage medium having program instructions embodied therewith, the program instructions executable by a computing device to cause the computing device to:

process, via a computing platform, (i) at least one machine learning model input by a first user and (ii) metadata corresponding to the at least one machine learning model input by the first user, wherein the at least one machine learning model input by the first user comprises multiple versions of the machine learning model;

automatically compare, via the computing platform, the metadata corresponding to the at least one machine learning model with metadata corresponding to one or more existing machine learning models stored by the computing platform;

automatically calculate, via the computing platform, initial pricing information for the at least one machine learning model, based at least in part on said comparing; and output, via an interactive user interface of the computing platform, the at least one machine learning model to one or more additional users for purchase in accordance with the calculated initial pricing information; and in response to a given one of the one or more additional users purchasing at least one of the multiple versions of the machine learning model, provide a deployment identifier to enable the at least one of the multiple versions to be deployed in programming code of the given user.

13. The computer program product of claim 12, wherein the multiple versions of the machine learning model comprise one or more scaled-up versions of the machine learning model and one or more scaled-down versions of the machine learning model.

14. The computer program product of claim 12, wherein the multiple versions of the machine learning model comprise at least one of different feature sets and different epochs.

15. The computer program product of claim 12, wherein the program instructions cause the computing device to:
compare model behavior of the multiple versions of the machine learning model in terms of one or more model characteristics; and
perform a relative pricing operation across the multiple versions of the machine learning model, based at least in part of said comparison of model behavior.

16. The computer program product of claim 12, wherein the program instructions cause the computing device to:
determine an optimized fixed number of versions of the machine learning model to output to the one or more additional users for purchase.

17. The computer program product of claim 12, wherein the program instructions cause the computing device to:
rank the multiple versions of the machine learning model based at least in part on one or more value-based parameters; and
wherein said outputting comprises outputting the multiple versions of the machine learning model to one or more additional users for purchase in accordance with said ranking.

18. The computer program product of claim 12, wherein the metadata comprise at least one of (i) one or more objectives achieved by the at least one machine learning model, (ii) one or more epochs corresponding to the at least one machine learning model, (iii) a feature set corresponding to the at least one machine learning model, (iv) a dataset size corresponding to the at least one machine learning mode, and (v) an identified set of best features used during training of the at least one machine learning model.

19. A system comprising:
a memory; and
at least one processor operably coupled to the memory and configured for:
processing, via a computing platform, (i) at least one machine learning model input by a first user and (ii) metadata corresponding to the at least one machine learning model input by the first user, wherein the at least one machine learning model input by the first user comprises multiple versions of the machine learning model;
automatically comparing, via the computing platform, the metadata corresponding to the at least one machine learning model with metadata corresponding to one or more existing machine learning models stored by the computing platform;
automatically calculating, via the computing platform, initial pricing information for the at least one machine learning model, based at least in part on said comparing; and
outputting, via an interactive user interface of the computing platform, the at least one machine learning model to one or more additional users for purchase in accordance with the calculated initial pricing information; and
in response to a given one of the one or more additional users purchasing at least one of the multiple versions of the machine learning model, providing a deployment identifier to enable the at least one of the multiple versions to be deployed in programming code of the given user.

* * * * *